United States Patent
Lemaitre et al.

(10) Patent No.: US 6,206,775 B1
(45) Date of Patent: Mar. 27, 2001

(54) MOTOR VEHICLE HEATING AND/OR AIR CONDITIONING DEVICE COMPRISING A POLLUTION SENSOR

(75) Inventors: Nathalie Lemaitre, Viroflay; Stéphane Pernet, Paris, both of (FR)

(73) Assignee: Valeo Climatisation, La Verriere Cedex (FR)

( * ) Notice: Subject to any disclaimer, the term of this patent is extended or adjusted under 35 U.S.C. 154(b) by 0 days.

(21) Appl. No.: 09/441,833

(22) Filed: Nov. 17, 1999

(30) Foreign Application Priority Data

Nov. 18, 1998 (FR) .................................................. 98 14485

(51) Int. Cl.$^7$ .................................................. B60H 3/06
(52) U.S. Cl. .................................................. 454/75; 139/158
(58) Field of Search ........................ 454/75, 139, 147, 454/158

(56) References Cited

U.S. PATENT DOCUMENTS

| | | | |
|---|---|---|---|
| 4,610,703 | * | 9/1986 | Kowalczyk ........................ 454/158 X |
| 4,696,225 | * | 9/1987 | Weller ................................ 454/158 |
| 4,702,753 | * | 10/1987 | Kowalczyk ........................ 454/158 X |
| 4,875,406 | | 10/1989 | Holter et al. . |
| 5,256,103 | * | 10/1993 | Abthoff et al. ................... 454/158 X |
| 5,725,425 | | 3/1998 | Rump et al. . |
| 5,750,880 | | 5/1998 | Frere . |

FOREIGN PATENT DOCUMENTS

| | | | |
|---|---|---|---|
| 28 13 662 | * | 10/1979 | (DE) ..................................... 454/158 |
| 36 23 164 | | 1/1988 | (DE) . |
| 36 26 277 | | 2/1988 | (DE) . |
| 95/29072 | | 11/1995 | (WO) . |

OTHER PUBLICATIONS

French Search Report dated Jul. 30, 1999.

* cited by examiner

*Primary Examiner*—Harold Joyce
(74) *Attorney, Agent, or Firm*—Morgan & Finnegan, LLP

(57) ABSTRACT

In a motor vehicle heating or air conditioning device, a pollution sensor for detecting a pollutant, particularly carbon monoxide, in an airflow sent into the passenger compartment of the motor vehicle is arranged downstream of an air filter. The pollution sensor detects the presence of pollutant in the filtered airflow and supplies pollution measurements of the filtered airflow. The sensor is linked to a control circuit acting on an air intake flap to supply the passenger compartment with a mixture of external air from outside the passenger compartment and/or recirculated air from the passenger compartment, depending on the pollution measurement results.

22 Claims, 1 Drawing Sheet

MOTOR VEHICLE HEATING AND/OR AIR CONDITIONING DEVICE COMPRISING A POLLUTION SENSOR

FIELD OF THE INVENTION

The invention relates to a device for heating and/or air conditioning the passenger compartment of a motor vehicle.

It relates more particularly to a device comprising a pollution sensor suitable for detecting the presence of a pollutant, carbon monoxide in particular, in the airflow sent into the passenger compartment.

BACKGROUND OF THE INVENTION

In the known devices of this type, an air intake chamber is usually provided, which can be fed selectively either with external air taken in from outside the passenger compartment or with recirculated air taken up from the passenger compartment.

A blower is provided at the outlet from the air intake chamber for blowing the airflow so as to process it (by heating and/or cooling) before sending it into the passenger compartment through various appropriate nozzles.

In general, the air intake chamber houses a flap which controls the external air intake and the recirculated air intake selectively -Ln order to send into the passenger compartment either a flow of external air or a flow of recirculated air, depending on the air temperature regarded as comfortable by the occupants of the vehicle.

Hence, when the vehicle is passing through a polluted area, it is recommended that the device be placed in "recirculated air" position, so that the passenger compartment is supplied with recirculated air, and not with external air.

Conventionally, the change from the "recirculated air" position to the "external air" position, or vice versa, takes place at the discretion of the driver of the vehicle, that is to say on the basis of subjective observation.

It is also known to place a pollution sensor, also called air quality sensor, on a vehicle in order to detect the presence of a pollutant and then place the device in one or other of the "external air" and "recirculated air" positions, either at the initiative of the driver or automatically.

Up to the present time, these pollution sensors have been installed either at the front of the vehicle (behind the bumper, for example, or near the engine cooling unit), or in the "water separator" which is situated at the foot of the windshield.

In any event, these sensors were placed upstream of the air filter which serves to trap various impurities (particles, dust, etc.) or various gases (hydrocarbons, nitrogen dioxide, sulfur dioxide, etc.) contained in the external airflow.

Because the pollution sensor is always situated upstream of the air filter, the result is that this sensor is exposed to a flow of air loaded with particles, dust and various pollutants. This has the drawback of leading, in the more or less long-term, to fouling and to rapid deterioration of this type of sensor.

Object of the invention

One of the objects of the invention is to obtain a device for detecting the presence of pollutants which is more resistant to deterioration than the devices of the prior art.

Summary of the invention

According to one aspect of the present invention there is provided a device for heating and/or air conditioning the passenger compartment of a motor vehicle comprising a pollution sensor suitable for detecting the presence of a pollutant in an airflow sent into the passenger compartment, wherein the pollution sensor is arranged downstream of an air filter, so as to detect the presence of a pollutant in the filtered airflow.

As a result, the sensor is exposed to an airflow which has previously been filtered and which has therefore been cleaned of its particles and impurities. Consequently, the sensor deteriorates less rapidly.

The pollution sensor may be separate from the air filter, or be integrated into the air filter.

According to another aspect of the invention there is provided a device for heating and/or air conditioning the passenger compartment of a motor vehicle comprising a pollution sensor suitable for detecting the presence of a pollutant in an airflow sent into the passenger compartment, wherein the pollution sensor is arranged downstream of an air filter, so as to detect the presence of a pollutant in the filtered airflow, and further comprising an air intake chamber equipped with an intake for external air, an intake for recirculated air and with an air inlet flap that controls the air intakes selectively in order to supply the device with external air or with recirculated air. The air filter and the pollution sensor are placed upstream of the intake flap.

In a first embodiment of the invention, the air filter and the pollution sensor are intended to be housed in a receptacle, called water separator, which communicates with the air intake chamber and which is situated at the foot of the windshield of the vehicle.

In another embodiment, the air filter and the pollution sensor are intended to be housed in a duct of the air intake chamber which communicates with the external air intake.

According to another characteristic of the invention, the pollution sensor is linked to a control circuit able to act on the movement of the air intake flap and to bring it into one or other of the following two extreme positions:

- a position called "external air", when the pollution content detected by the sensor is below a given threshold;
- a position called "recirculated air", when the pollution content detected by the sensor reaches or exceeds said threshold.

The control circuit advantageously comprises a comparator suitable for comparing an electrical measurement signal output by the pollution sensor with a threshold value, and for deducing therefrom a control signal to be sent to a motor means suitable for moving the flap into one or other of its two extreme positions.

The pollution sensor detects a pollutant which is adsorbed only slightly by the filter. In particular, the filter detects the presence of carbon monoxide or of nitrogen monoxide in the airflow.

BRIEF DESCRIPTION OF THE DRAWINGS

In the description which follows reference will be made to the attached drawings, in which.

DESCRIPTION OF THE PREFERRED EMBODIMENTS

Figure 1:
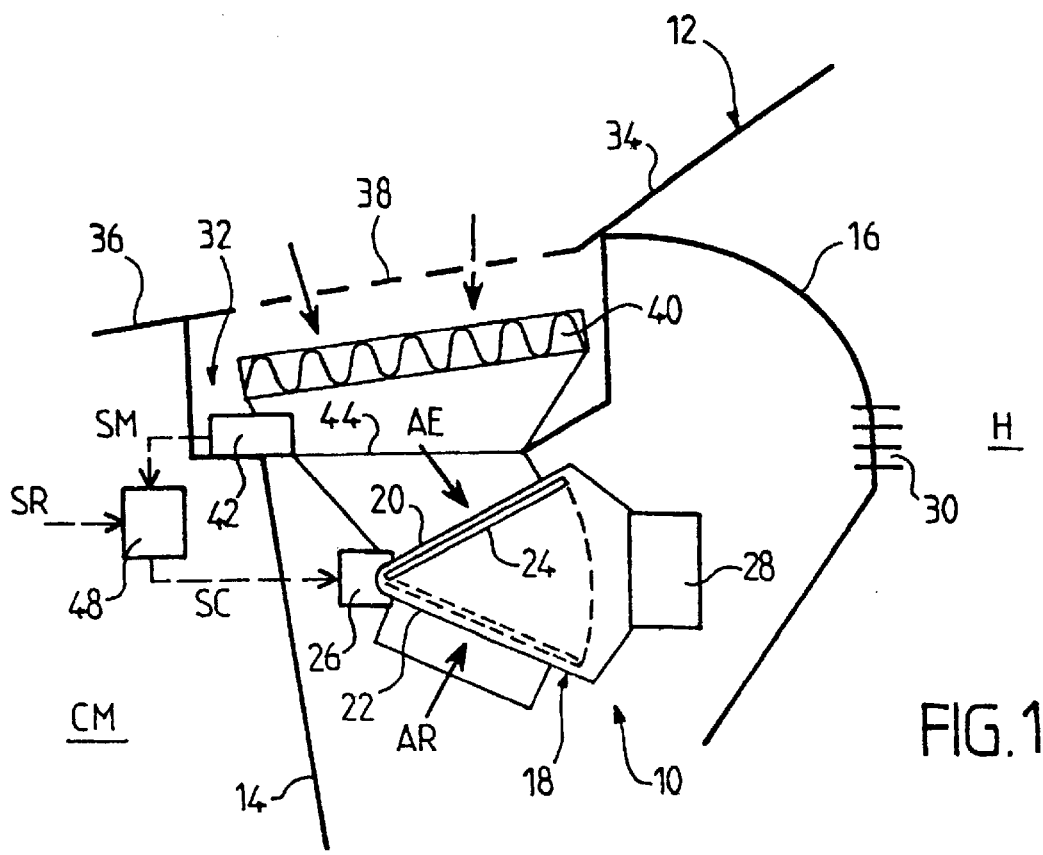
FIG. 1 is a diagrammatic view of a device according to a first embodiment of the invention.

Referring first of all to FIG. 1, a heating and/or air conditioning device 10 is shown (represented partially)

mounted within a motor vehicle 12. The device 10 is installed at the rear of the bulkhead 14 which separates the engine compartment CM from the passenger compartment H and is arranged at least partly under the dashboard 16 of the vehicle.

The device 10 comprises an air intake chamber 18 which is equipped with an intake 20 for external air AE taken in from outside the passenger compartment H and an intake 22 for recirculated air AR taken up from the passenger compartment H. The air intake chamber 18 houses an air intake flap 24 which is capable of pivoting between two extreme positions, under the action of a motor 26 for selectively controlling the intakes 20 and 22.

The flap 24 may be placed in either of the following extreme positions:
  a position called "external air" in which the flap 24 occupies the position (represented in broken line) so as to close the recirculated air intake 22 and open the external air intake 20.
  a position called "recirculated air", in which the flap 24 occupies the position (represented in solid line) so as to close the external air intake 20 and open the recirculated air intake 22.

Provision may be made for placing the flap in at least one intermediate position, lying between the two abovementioned extreme positions, if desired.

A blower 28 is linked to the outlet from the chamber 18 in order to send the airflow into other parts (not represented) of the device. The airflow is thus processed, that is to say heated and/or cooled, then sent to the passenger compartment through various nozzles, for example through a vent 30 provided on the instrument panel 16.

The vehicle 12 includes a receptacle 32, also called "water separator", which is placed at the foot of the windshield 34 and partly below the engine hood 36. This compartment 32 is covered by a grille 38 and it may thus be fed with the external air AE arrows taken in from outside the passenger compartment. The receptacle 32 makes it possible to separate the rainwater which is removed by appropriate means, while the external air is intended to supply the device 10.

In a first embodiment of the invention, the receptacle 32 houses an air filter 40 which is arranged in a substantially horizontal position under the grill 38. This filter makes it possible to catch various impurities or particles contained in the airflow drawn in by the blower 28.

The device of the invention further comprises a pollution sensor 42 which is placed against the bottom wall 44 of the receptacle 32. The sensor 42 is arranged downstream of the air filter 40 with respect to the direction of movement of the external air flow AE, so that this sensor is exposed to the flow of air which has already been filtered. Therefore, the filter is less subject to clogging.

The pollution sensor 42, also called "air quality sensor" makes it possible to detect the presence of pollutants, for example carbon monoxide (CO), contained in the previously filtered external air flow.

The pollution sensor 42 may be separate from the air filter or incorporated into the air filter.

The sensor 42 is linked to a control circuit which comprises a comparator 48 suitable for comparing an electrical measurement signal SM output by the sensor with a reference signal SR giving a threshold value and for deducing therefrom a control signal SC which is sent to the motor 26 acting on the movement of the flap 24.

If the pollution content detected by the sensor is below a given threshold, that is to say if SM is less than SR, the motor 26 places the flap in the "external air" position (position in broken line) so that the device is supplied with external air AE.

In contrast, if the pollution content detected by the sensor 42 reaches or exceeds the threshold value, that is to say if SM is greater than or equal to SR, the flap 24 is placed in the "recirculated air" position (represented in solid line in FIG. 1), so that the device is fed only with recirculated air AR originating from the passenger compartment H.

Hence, the device of the invention makes it possible to detect the presence of pollutants in the already filtered external airflow, and to bring the flap 24 automatically into one or other of its extreme positions, as a function of the presence or the absence of pollutant.

Areas of pollution consist mainly of a mixture of dust and of various gases (hydrocarbons, nitrogen dioxide, sulfur dioxide, etc.). In heating and air conditioning devices, three types of filters are generally used.

Particle filters, comprise a fibrous medium, filter dust such as ash, spores or pollen. With this type of filter no gas is adsorbed.

Odor filters, a layer of activated carbon, filter certain gases.

Finally, compound filters consist of a fibrous medium and of a layer of activated carbon. They filter dust and certain types of gas.

Certain gases or pollutants are adsorbed very little by odor filters or by compound filters, carbon monoxide for example. According to the principle of the invention, the air quality sensor is particularly sensitive to a pollutant which is adsorbed with difficulty by the existing filters. Hence, although placed after the filter, this sensor nevertheless detects the presence of the gas which is adsorbed little by the filter and consequently the presence of an area of pollution.

Comparative measurements have been taken by placing two pollution sensors, one downstream of the filter (as in the invention) and another upstream of the filter (as in the prior art).

It was observed that, in the two types of measurements, the same pollution peaks were encountered. This shows that the sensor installed downstream of the filter, as provided for in the invention, makes it possible to detect the pollution peaks and consequently to provide for automatic management of the "external air" or "recirculated air" positions of the device.

Figure 2:
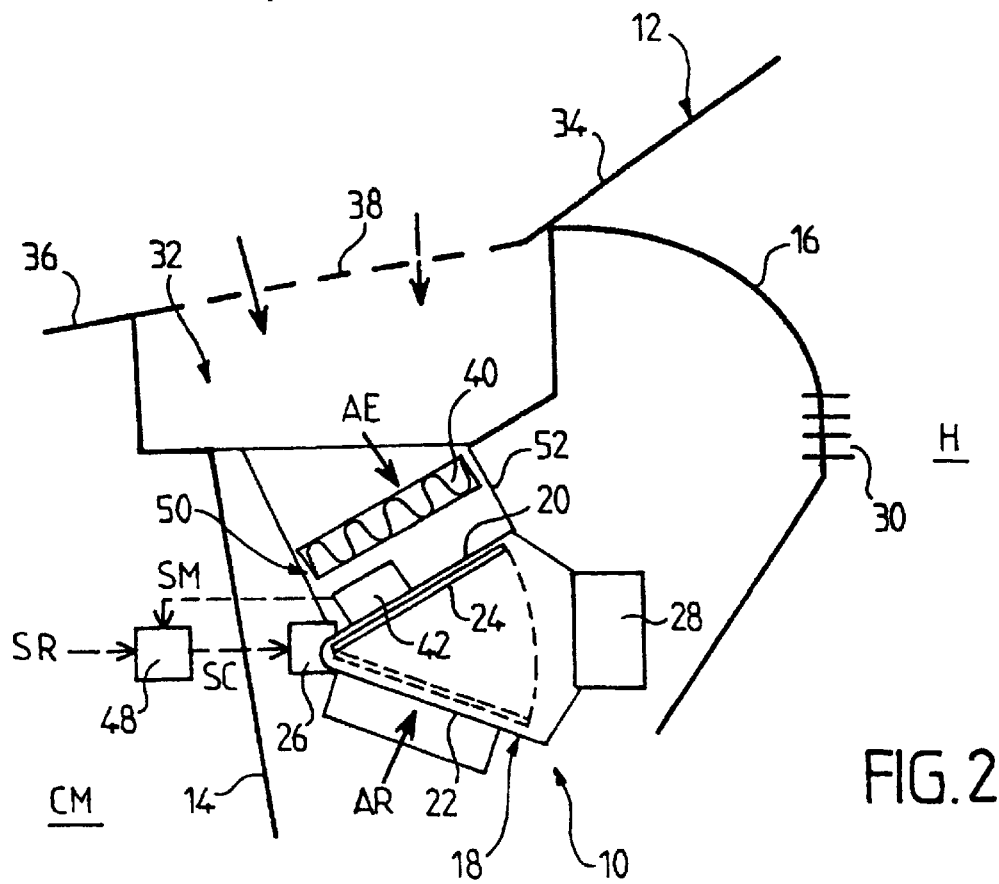
FIG. 2 is a view similar to FIG. 1 in a second embodiment.

In a second embodiment of the invention, represented in FIG. 2, the air filter 40 and the air quality sensor 42 are arranged in a duct 50 of the air intake chamber 18 which forms the connection between the receptacle 32 and the air intake 20.

The sensor 42 is placed downstream of the filter with respect to the direction of movement of the airflow. Advantageously, the filter unit includes a hatch 52 allowing access to the filter 40 for the purposes of replacing it and making it possible, if needs be, to work on the sensor 42.

This second embodiment of the invention is particularly advantageous since it does not require the use of a sensor which is impervious to water. Moreover, the filter and the sensor can be mounted directly on an inner wall of the air intake, which results in greater ease of assembly for the constructor of the device.

Needless to say, the invention is not limited to the embodiments described above by way of example, and extends to other variants. Thus, the sensor may be intended to detect other types of pollutants.

What is claimed is:

1. A device for heating and/or air conditioning the passenger compartment of a motor vehicle with an airflow, the device comprising an air filter for receiving external air from outside the passenger compartment;

an air intake chamber downstream of the air filter, the air intake chamber including
- a first intake for external air that has been filtered,
- a second intake for recirculated air from inside the passenger compartment, and
- an intake flap able to selectively control the first intake and the second intake in order to supply the passenger compartment with external air and/or with recirculated air; and a pollution sensor suitable for measuring a pollutant in the airflow supplied to the passenger compartment and issuing a control signal for adjusting the intake flap in response to the pollutant that has been measured, the pollution sensor arranged downstream of the air filter to measure the pollutant in the external air that has been filtered.

2. The device of claim 1, wherein the pollution sensor is separate from the air filter.

3. The device of claim 1, wherein the pollution sensor is integrated into the air filter.

4. The device of claim 1, wherein the pollution sensor measures carbon monoxide in the airflow.

5. The device of claim 1, wherein the pollution sensor measures nitrogen monoxide in the airflow.

6. A device for heating and/or air conditioning the passenger compartment of a motor vehicle with an airflow, the device comprising
   an air filter;
   a pollution sensor suitable for detecting the presence of a pollutant in the airflow sent into the passenger compartment and for issuing a control signal, wherein the pollution sensor is arranged downstream of the air filter, so as to detect the presence of a pollutant in the airflow that has been filtered, and
   an air intake chamber equipped with
   an intake for external air,
   an intake for recirculated air, and
   an air intake flap able to control said external air intake and said recirculated air intake selectively in order to supply the passenger compartment with external air and/or with recirculated air in response to the control signal issued by the pollution sensor,
   wherein the air filter and the pollution sensor are placed upstream of the air intake flap.

7. The device of claim 6, further including a water separator, wherein the air filter and the pollution sensor are housed in the water separator, which communicates with the air intake chamber.

8. The device of claim 6, wherein the air intake chamber includes a duct, wherein the air filter and the pollution sensor are housed in the duct of the air intake chamber which communicates with the external air intake.

9. The device of claim 6, further including a control circuit, wherein the air sensor is linked to the control circuit which is able to move the air intake flap into one of the following two extreme positions:
   a position called "external air," when the pollution content detected by the pollution sensor is below a given threshold, to supply the passenger compartment with external air only and to cut off recirculated air to the passenger compartment;
   a position called "recirculated air," when the pollution content detected by the pollution sensor reaches or exceeds said threshold, to cut off external air to the passenger compartment and to supply the passenger compartment with recirculated air only.

10. The device of claim 6, wherein the pollution sensor detects a pollutant which is adsorbed only slightly by the filter.

11. The device of claim 6, wherein the pollution sensor detects the presence of carbon monoxide in the airflow.

12. The device of claim 6, wherein the pollution sensor detects the presence of nitrogen monoxide in the airflow.

13. A vehicle comprising the device for heating and/or air conditioning of claim 1.

14. A vehicle comprising the device for heating and/or air conditioning of claim 6.

15. The device of claim 6, further including a control circuit, wherein the pollution sensor is linked to the control circuit, said control circuit able to move the air intake flap into a position selected from the group consisting of
   an "external air" position when the pollution content detected by the pollution sensor is below a first given threshold;
   a "recirculated air" position when the pollution content detected by the pollution sensor exceeds a second given threshold; and
   and intermediate position between said "external air" position and said "recirculated air" when the pollution content detected by the pollution sensor is between said first given threshold and said second given threshold.

16. A device for providing a passenger compartment of a motor vehicle with an airflow, said device comprising
   an air filter having an upstream end and a downstream end, said air filter in communication at said upstream end with external air exterior to the passenger compartment, said air filter providing filtered air at said downstream end;
   a pollution sensor arranged downstream of said air filter, said pollution sensor detecting the presence of a pollutant in said filtered air and issuing a control signal; and
   an air intake chamber arranged downstream of said pollution sensor and in communication with said the passenger compartment, said air intake chamber including
   a filtered air intake for receiving said filtered air,
   an recirculated air intake for receiving recirculated air from the passenger compartment, and
   an air intake flap able to selectively block said filtered air intake and said recirculated air intake in order to supply the passenger compartment with said filtered air and/or said recirculated air in response to said control signal.

17. The device of claim 16, wherein the pollution sensor detects a pollutant which is adsorbed only slightly by the filter.

18. The device of claim 16 wherein the pollution sensor detects the presence of a pollutant selected from the group consisting of carbon monoxide and nitrogen monoxide.

19. The device of claim 16 further including a water separator, wherein said air filter and said pollution sensor are housed in the water separator, said water separator in communication with said air intake chamber.

20. The device of claim 16, wherein said air intake chamber includes a duct, said air filter and said pollution sensor housed in said duct, said duct in communication with said filtered air intake.

21. The device of claim 16 further including a control circuit, said control circuit operative to receive an pollution content measurement from said pollution sensor, to perform a comparison of said pollution content measurement to a predetermined threshold, and to move said air intake flap in response to said comparison into one of an "external air" position, when said pollution content measurement is below said predetermined threshold, a "recirculated air" position, when said pollution content measurement exceeds said predetermined threshold, or an "intermediate" position, when said pollution content measurement equals said predetermined threshold.

22. A method of providing an airflow from an air chamber having a first inlet, second inlet, a flap and an outlet a passenger compartment of a motor vehicle, the method comprising the steps of:

providing external air from outside the passenger compartment to a filter;

filtering said external air to obtain filtered air;

measuring a pollution content of said filtered air;

providing said filtered air to said first inlet of said air chamber;

providing recirculated air from inside the passenger compartment to said second inlet of said air chamber;

adjusting said flap of said air chamber to block at least partially said first inlet and/or said second inlet in response to the pollution content that has been measured;

providing said airflow to the passenger compartment from said outlet of said air chamber.

* * * * *